United States Patent [19]
Thomlinson et al.

[11] Patent Number: 5,778,069
[45] Date of Patent: Jul. 7, 1998

[54] NON-BIASED PSEUDO RANDOM NUMBER GENERATOR

[75] Inventors: Matthew W. Thomlinson, Bellevue; Daniel R. Simon, Redmond, both of Wash.; Bennet Yee, San Diego, Calif.

[73] Assignee: Microsoft Corporation, Redmond, Wash.

[21] Appl. No.: 628,552

[22] Filed: Apr. 10, 1996

[51] Int. Cl.[6] .................................................. H04L 9/00
[52] U.S. Cl. .......................... 380/25; 380/30; 380/46; 364/717.01
[58] Field of Search ........................... 380/25, 28, 30, 380/42, 46; 364/717.01

[56] References Cited

U.S. PATENT DOCUMENTS

| | | | |
|---|---|---|---|
| 4,118,788 | 10/1978 | Roberts | 364/926.1 |
| 5,005,200 | 4/1991 | Fischer | 380/30 |
| 5,432,852 | 7/1995 | Leighton et al. | 380/30 |
| 5,465,353 | 11/1995 | Hull et al. | 707/5 |
| 5,608,801 | 3/1997 | Aiello et al. | 380/46 |

OTHER PUBLICATIONS

IBM Technical Disclosure Bulletin "High Work Factor Hash Total"; vol. 25, No. 1; Svigals, J., Jun. 1982.

*Primary Examiner*—George M. Dombroske
*Assistant Examiner*—Paul D. Amrozowicz
*Attorney, Agent, or Firm*—Lee & Hayes, PLLC

[57] ABSTRACT

A computer-implemented pseudo random number generator includes an input device to assemble multiple classes of bits from multiple sources into an input bit string. The multiple classes of bits include an internal class of bits from at least one source internal to the random number generator, such as a static bit register which maintains the current state of the generator. The input device also gathers one or more external classes of bits from one or more sources external to the random number generator, such as a machine class of bits which relate to operating parameters of the computer and an application class of bits which relate to execution of an application running on the computer. The input device concatenates the three classes of bits into an arbitrary length input bit string. The random number generator also has a hash computing device which computes an m-bit hash value of the input bit string assembled by the input device. The hash computing device computes the hash value using a hashing function, such as SHA (secure hash algorithm), whereby it is computationally infeasible to derive the concatenated input bit string from the output hash value or intentionally bias the output of the hash function. The SHA is a one-way hash that reduces the 512-bit input bit string to a 160-bit hash value. The hash value becomes the initializing seed for the random number generator. A stream generator (i.e., a stream cipher) is coupled to the hash computing device to receive the hash value. The stream generator uses the hash value as the initializing seed to produce an output bit string of random (or pseudo random) bits.

39 Claims, 5 Drawing Sheets

NON-BIASED PSEUDO RANDOM NUMBER GENERATOR

TECHNICAL FIELD

This invention relates to pseudo random number generators. More particularly, this invention relates to computer-implemented pseudo random number generators that electronically produce strings of random bits.

BACKGROUND OF THE INVENTION

Random number generators are used in a wide variety of contexts, including cryptography, noise generation, and gambling. This disclosure is particularly directed to the use of random number generators in cryptography.

Ideally, a perfectly secure cryptography system has a perfect random number generator that produces truly random numbers. Any nonrandom, plaintext message that is encrypted using a truly random key sequence produces a completely random ciphertext message. By using a perfectly random key sequence, every plaintext message decrypted from the ciphertext message is equally possible and the cryptoanalyst cannot find any shortcut over a brute-force search of the entire key space.

However, this is not a perfect world. In the computer age, a perfect electronic random number generator that produces a truly random sequence of bits is considered to be impossible. Accordingly, designers attempt to devise electronic "pseudo"-random number generators which create unpredictable sequences of bits in which no one bit is more likely to be generated at a given time or place in the sequence than any other. While recognizing that perfection is perhaps unattainable, this disclosure will interchangeably use the terms "random number generator" and "pseudo random number generator."

Figure 1:
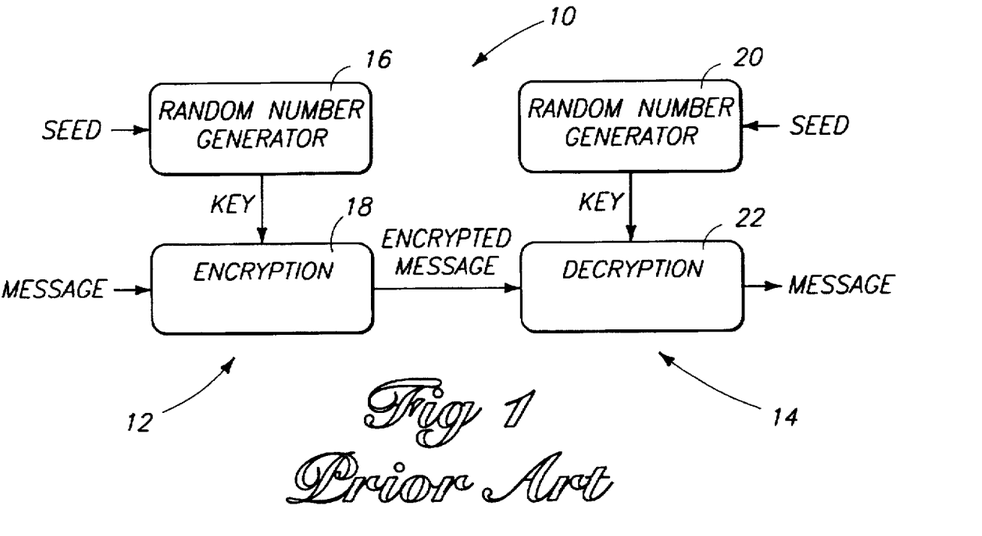
FIG. 1 is a block diagram of a prior art stream cipher cryptography system.

FIG. 1 shows a prior art cryptography system 10 having an encryption device 12 and a decryption device 14. For this example, the illustrated cryptography system 10 is implemented as a conventional stream or block cipher. The encryption device 12 has a random number generator 16 and an encryption cipher 18. The random number generator 16 generates a sequence of random bits known as a "key stream." The encryption cipher 18 uses the key stream to encrypt the plaintext message into an encrypted message. The decryption device 14 has a random number generator 20 and a decryption cipher 22. The random number generator 20 generates a key stream of random bits and the decryption cipher 22 uses the key stream to decrypt the encrypted message back into the plaintext message.

The illustrated stream cipher system 10 requires that both random number generators 16 and 20 produce the same key stream. If the key streams are different, the decryption device 14 will not recover the same message that is encrypted by the encryption device 12. To ensure generation of the same key stream, the computer-implemented random number generators 16 and 20 are initialized with a initial string of bits known as a "seed," or a "key." Generally, the two random number generators, using the same input seed, will generate the same key stream.

Figure 2:
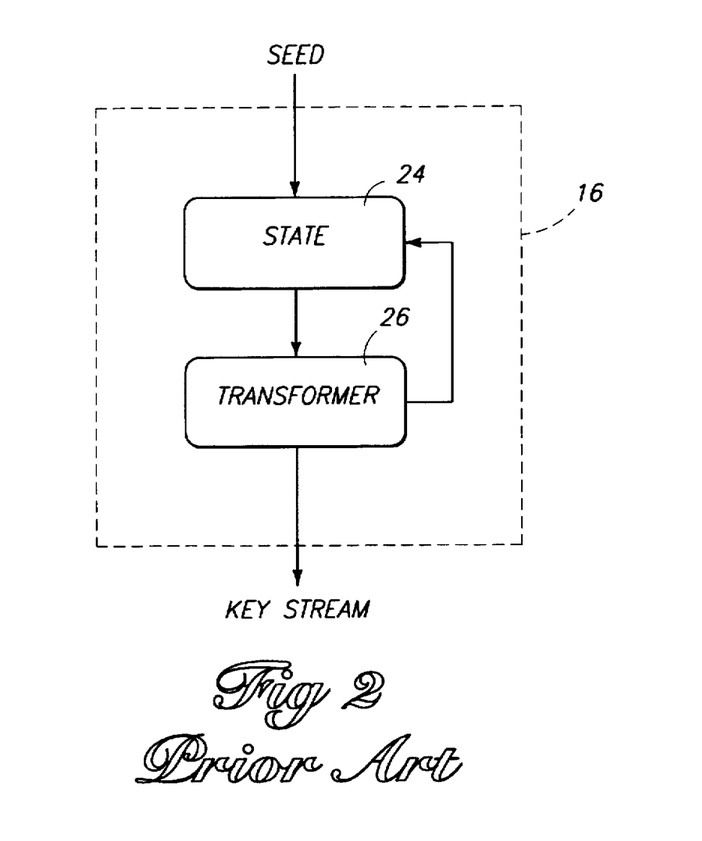
FIG. 2 is a block diagram of a prior art random number generator.

FIG. 2 shows the random number generator 16 in more detail. The seed is input to an internal state register 24 which describes the current state of the generator. The value held in the internal state register 24 is input to transformer logic 26 which transforms the value into a key stream of random bits using a mathematical function. The key stream is output to the encryption/decryption cipher as shown in FIG. 1. The transformer logic 26 also simultaneously reconfigures the value held in the internal state register 24 via the feed back path to change the previous state value to a next state value. This feed back aspect continually mixes the static bits held in register 24 which contributes to the randomness of the key stream.

During operation, the random number generator 16 receives the seed at initialization. Thereafter, the random number generator 16 generates the stream of random numbers by reconstituting the value held in the internal state register 24.

As demonstrated in the example stream cipher system 10, the security of modern day electronic cryptography rests in two places: (1) the cipher that is used to perform the encryption and decryption, and (2) the random number generator that is used to produce pseudo-random strings of bits which are used as keys for the cipher. A strong, secure cryptographic system requires both parts. If the cipher is weak, a cryptoanalyst can attack the encrypted message by focusing on mathematical relationships that would effectuate the observed transformation. On the other hand, if the random number generator is weak and does not produce pseudo-random keys, the cryptoanalyst can attack the encrypted message by discovering the underlying keying material that was used to encrypt the message.

Taken a step further, the strength and security of a random number generator is also rooted in two places: (1) the transformation function and (2) the initial seed. For optimum security, the initial seed should be as random as possible, and the transformation function should produce statistically balanced and unguessable bit strings from the initial seed. For the most part, the transformation functions used in random number generators are generally considered strong. The weak point in random number generators has often been the inability to create sufficiently random initializing seeds.

Unfortunately, creation of a random seed is more difficult than one might think. Ideally, the bits in an n-bit seed are totally random, yielding a maximum entropy of n bits whereby the n-bit seed cannot be determined to any degree of certainty without knowledge of all n bits. However, in practice, the entropy of the seed is always less than optimal as there is always some predictability in the bits created for the seed. Common techniques for creating a seed include use of operating parameters of the computer, including time of day information, date, amount of memory available at a given time, and so on. In general, these parameters are regarded as sufficiently random for simple cryptography applications. However, these parameters are also suspect in that they can lend themselves to predictability in certain situations.

Recently, a company named "Netscape," which produces computer online products, made headlines when two college students successfully attacked its cryptography system. The cause of the weakness was a random number generator that used seeds which were too predictable. Although the seeds themselves consisted of a large number of bits, the entropy of the seed bits was too low and thus the cryptoanalysts were able to successfully guess the initializing seed. Once that seed was discovered, the cryptoanalysts were able to easily decrypt the messages, even though the cryptographic cipher itself was strong.

Accordingly, there is an continuing need to heighten the security of computer-implemented cryptography systems. Consistent with this goal is a need to develop secure random number generators that produce pseudo random bit strings and computer techniques that create seeds of high entropy.

SUMMARY OF THE INVENTION

This invention provides a pseudo random number generator that produces a random bit string by utilizing a seed with high entropy. The seed itself is created in a manner that ensures unguessability, while preventing any biasing of the bit string through manipulation of the input bits.

According to one aspect of this invention, a computer-implemented random number generator includes an input device which assembles multiple classes of bits from multiple sources into an input bit string. The multiple classes of bits include an internal class of bits that are derived from at least one source internal to the random number generator. One example of this internal class is a set of static bits which are kept in the generator.

The input device also gathers one or more external classes of bits from one or more sources external to the random number generator. For instance, in the preferred implementation, the input device gathers a machine class of bits which relate to operating parameters of the computer (e.g., time of day, date, memory allocation) and an application class of bits which relate to execution of an application running on the computer. In this last class, the application supplies the bits to the random number generator. One example of an application class of bits is a set of bits produced by monitoring keystroke frequency as the user types in a message. The input device concatenates the three classes of bits into an arbitrary length input bit string.

The random number generator has a hash computing device which takes the input bit string assembled by the input device and computes an m-bit hash value. The hash computing device uses a cryptographic hashing function to compute the hash value. The hashing function has a characterizing property in that it is computationally infeasible to derive the input value from the output value. One suitable hashing function is SHA (secure hash algorithm), a one-way hash that reduces a 512-bit input bit string to a 160-bit hash value which can be chained together for longer values. The hash value becomes the initializing seed for the random number generator.

The random number generator also has a stream generator coupled to the hash computing device to receive the hash value. The stream generator uses the hash value as the initializing seed to produce an output bit string of pseudo random bits. The output bit string can be in the form of a continual sequence of random bits, or can be broken into keys of finite length.

According to another aspect of this invention, the random number generator includes a bit manipulating device to alter the bit value of one of the input bit classes. In the illustrated implementation, the bit manipulating device alters the bits in the static register according to a function of the previous state value and the hash value computed by the hash computing device. More particularly, the function can be a hashing function which produces a next state value according to a hash of the previous state value and the hash value.

According to other aspects of this invention, the random number generator is employed in a computer or electronic based cryptography system that can be implemented on a computers.

BRIEF DESCRIPTION OF THE DRAWINGS

The same reference numbers are used throughout the drawings to reference like components and features.

DETAILED DESCRIPTION OF THE PREFERRED EMBODIMENT

The following discussion assumes that the reader is familiar with cryptography techniques. For a basic introduction of cryptography and random number generation, the reader is directed to a text written by Bruce Schneier and entitled, "Applied Cryptography: Protocols, Algorithms, and Source Code in C," published by John Wiley & Sons with copyright 1994. This text is hereby incorporated by reference. For discussion purposes, the random number generator is first described in its general form, without detailed reference to a preferred context. Thereafter, it is described in the context of a computer-implemented cryptography system.

Figure 3:
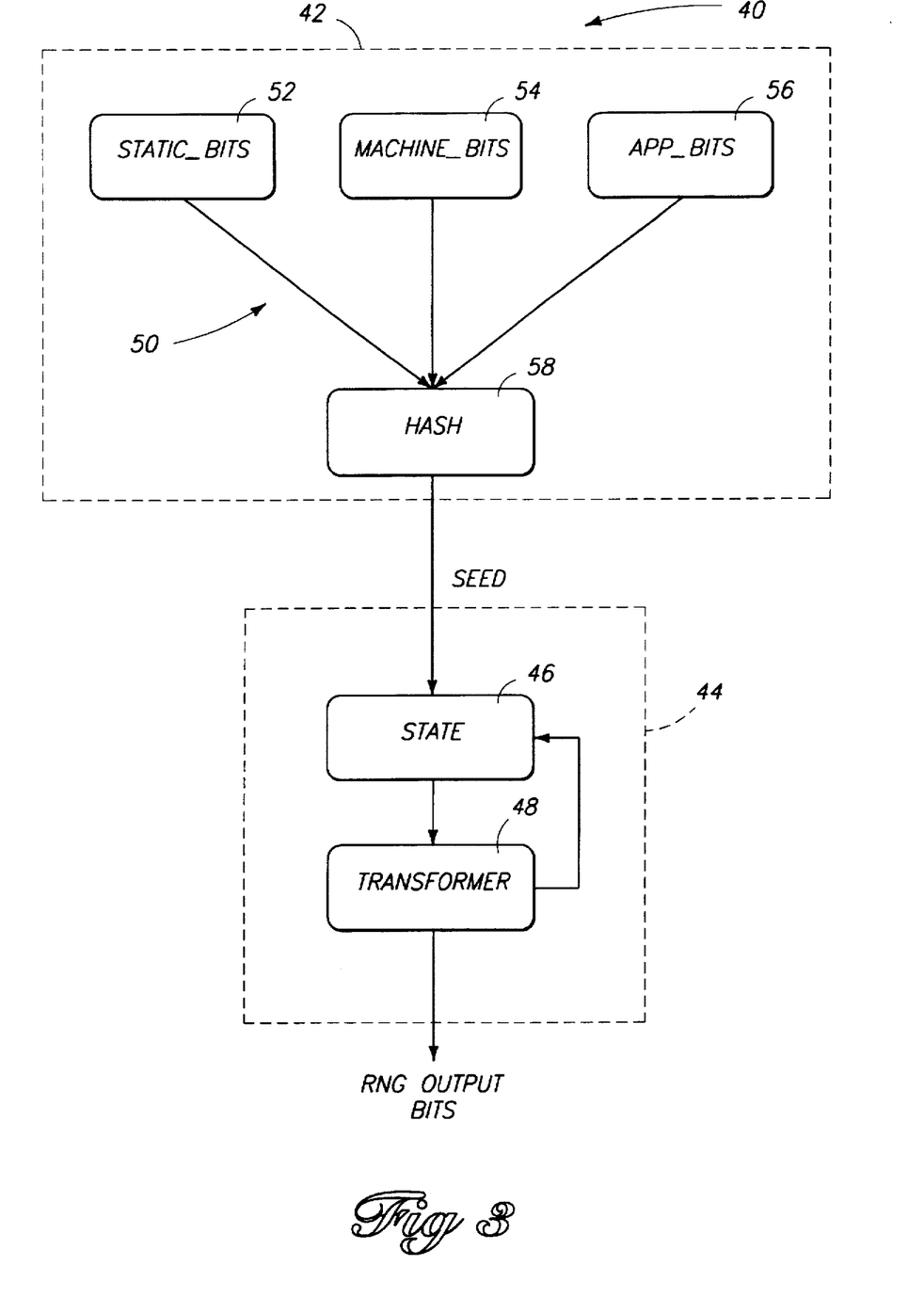
FIG. 3 is a block diagram of a random number generator according to one aspect of this invention.

FIG. 3 shows a pseudo random number generator 40 according to a first implementation of this invention. The pseudo random number generator 40 includes a random bit seed creating unit 42 and a stream generator 44. The seed creating unit 42 creates an initializing seed of high entropy that is used by the stream generator 44 to generate pseudo random numbers. The stream generator 44 includes an internal state 46 which maintains the current state of the stream generator. The internal state 46 can be configured as a register (e.g., a physical register, buffer, cache, or reserved memory location) which stores bits representative of the current state value.

The seed is input to the internal state register 46 to initialize the stream generator 44. The bit value held in the state register 46 is output to a transformer 48 which generates an output bit string of random bits according to a selected mathematical transformation (e.g., stream ciphers). The transformer 48 also feeds back one or more bits to the state register to alter the bits held therein from a previous bit value to a next bit value. In this manner, the seed is the initial state value in the stream generator 44 from which generation of random numbers is rooted. Following this initialization, the stream generator 44 updates the state value using feedback from the transformer 48 to produce a next bit value for subsequent number generation.

The seed creating unit 42 has an input device 50 which assembles multiple classes of bits from multiple sources into an input bit string. One class of bits gathered by the input device 50 is an internal class of bits which are derived from at least one source internal to the random number generator 40. As an example, the internal class of bits is a static class of bits kept in the generator. The static class of bits is represented by block 52.

The input device 50 also gathers one or more external classes of bits from one or more sources external to the random number generator. For instance, in the illustrated implementation, the input device gathers a machine class of bits which relate to operating parameters of the computer (e.g., time of day, date, memory allocation). The machine class of bits is represented by block 54. Another external class of bits is an application class of bits which relate to execution of an application running on the computer. The application class of bits is represented by block 56. In this last class, the application supplies the bits to the input device. The application bits are assumed to be only weakly random. One example of an application class of bits is a set of bits produced by monitoring keystroke frequency as the user types in a message.

Table 1 summarizes the three classes of bits used by the seed creating unit 42.

TABLE 1

| Class | Source | Type |
| --- | --- | --- |
| Static | Internal - Maintained in the random number generator. | State value held in register |
| Machine | External - Retrieved from the computer. | Time of Day<br>User ID<br>Date<br>Memory Allocation<br>Current Thread Identifier<br>System clock ticks since boot<br>Mouse cursor position<br>Disk Space Availability<br>Last Windows Message Timestamp<br>Computer Name |
| Application | External - Passed into the random number generator from an application executing on the computer. | Keystroke Frequency<br>User Input PIN<br>Cursor Movement |

In general, there are two different ways that the input device 50 can gather or assemble the classes of bits. One way is to have the different classes of bits passed into the input device 50, while the second way is to configure the input device to actively go out and retrieve the classes of bits from the external sources. For instance, in the former approach, the input device 50 is constructed as a set of passive registers, whereby block 52 represents a register to hold the static class of bits, block 54 represents a register to hold the machine class of bits, and block 56 represents a register to hold the application class of bits. The registers can be implemented in hardware or software and sized to hold the appropriate number of bits for the respective classes. The computer and applications pass the bits into the appropriate registers of the input device. Alternatively, in the latter approach, the input device 50 is configured to actively call and request the external classes from the computer or application. In this situation, some of the blocks 52, 54, and 56 represent a combination of software routines which execute on a computer to retrieve bits from the external sources and memory-based registers which hold the retrieved bits.

The input device 50 concatenates the three classes of bits into an arbitrary length input bit string. The allocation of bits from the three classes can be varied and adjusted as desired.

The seed creating unit 42 also has a hash computing device 58 which is coupled to receive the string of concatenated classes of bits. The hash computing device 58 computes an m-bit hash value from the input bit string. In one implementation, the hash computing device 58 uses a one-way hash function known as SHA (secure hash algorithm) to produce a 160-bit hash value from an input bit string. The hash value is used as the initializing seed for the stream generator 44.

The seed creating unit 42 produces a seed of high entropy that has a pseudo random sequence of bits. These desirable attributes are achieved by a combination of two factors: (1) using multiple classes of bits (from both internal and external sources) as an input string and (2) using a one-way hashing function to prevent any observable biasing through careful selection of bits in the input string. For this second reason, the hash computing device 58 is advantageous over other possible combining or mixing functions. Use of a hashing function ensures that the input bits, and particularly the weakly random application class of bits which are optionally passed into the random number generator, cannot bias the seed produced by the seed creating unit 42. The nature of the one-way function makes it impossible to create any biasing as a result of carefully chosen input bits. Accordingly, the application class of bits passed into the seed creating unit 42 from an application can only improve randomness of the seed (i.e., increase entropy), but cannot degrade or lessen the randomness of the seed.

Compare, for example, the advantage of the hash computing device with use of a simple XOR operation. An XOR mixing function of the machine class of bits and the application class of bits returns a number that could be biased towards one or zero. To accomplish this bias, a rogue application might supply bits from the same or related sources as the random number generator gathers. Such a biased seed output is not desirable. The properties of the hashing function obviates any such bias.

The stream generator 44 uses the seed to initialize the internal state register 46 and begins generating a string of random output bits from the seed. The transformation employed in the stream generator 44 has the property that given the output string of bits, it is computationally infeasible to derive the initializing key or seed that was used to generate the output. Accordingly, the stream generator 44 acts to conceal the seed output by the seed creating unit 42, which in turn enhances the security of the random number generator 40.

The seed can be input to the stream generator 44 as frequently as the context demands. For instance, a cryptography context might demand high security, resulting in a desire to input a new seed for encryption of each message or portion of the message. The seed creating unit 42 can operate in parallel with the stream generator 44 to create new seeds at the same time that the random bit output string is being generated using a previous seed. The parallel tasking provides efficient, streamline throughput.

Figure 4:
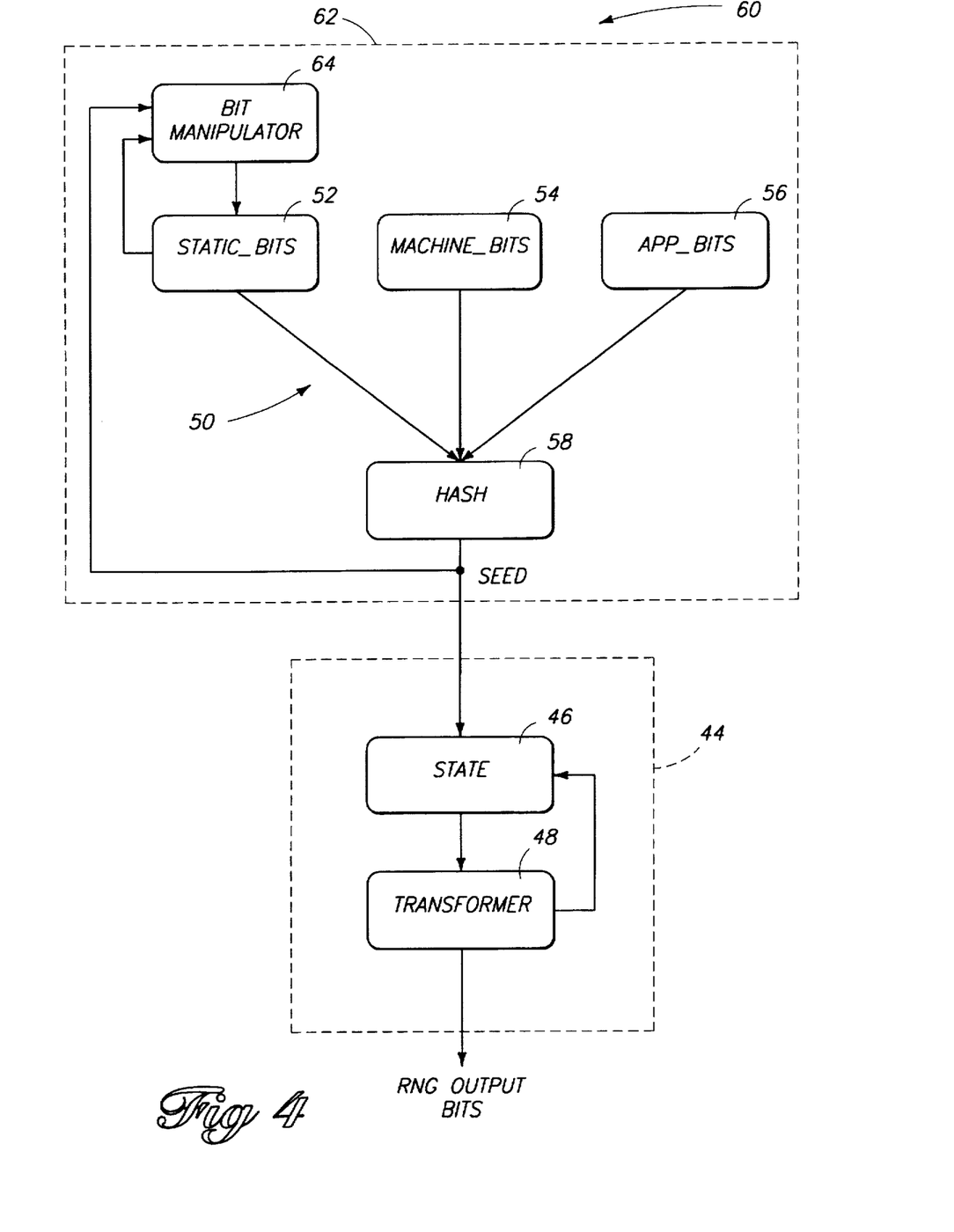
FIG. 4 is a block diagram of a random number generator according to another aspect of this invention.

FIG. 4 shows a pseudo random number generator 60 according to a second implementation of this invention. The pseudo random number generator 60 is similar to the previously described generator 40 in that it includes a seed creating unit 62 and a stream generator 44. However, the modified seed creating unit 62 is configured to include a bit manipulating device 64 which alters the bit value in the static class of bits 52 from a previous bit value that was already used in the hash computing device 58 to a next bit value that will be used next time the random number generator requests a new seed. This might entail changing one or more bits in the register 52, or shifting the bits, or replacing the bits altogether. In this manner, the bit value maintained in register 52 reflects the current state of the generator.

In the illustrated implementation, the bit manipulating device 64 is connected to receive the previous bit value from the static bit register 52 and the hash value computed by the hash computing device 58. The bit manipulating device 64 computes a next bit value according to a function of the previous bit value and the hash value. The function can be a mixing function, such as an XOR operation, which is safe for this component of the random number generator because it uses the non-biased hash value as an input. Alternatively, the bit manipulating device 64 might employ its own hashing function, such as SHA, to produce a next bit value. However, with the use of a cryptographic hashing function, the static bits could be saved directly to insecure storage. The bit manipulating device 64 replaces the previous bit value in the static bit register 52 with the next bit value.

Figure 5:
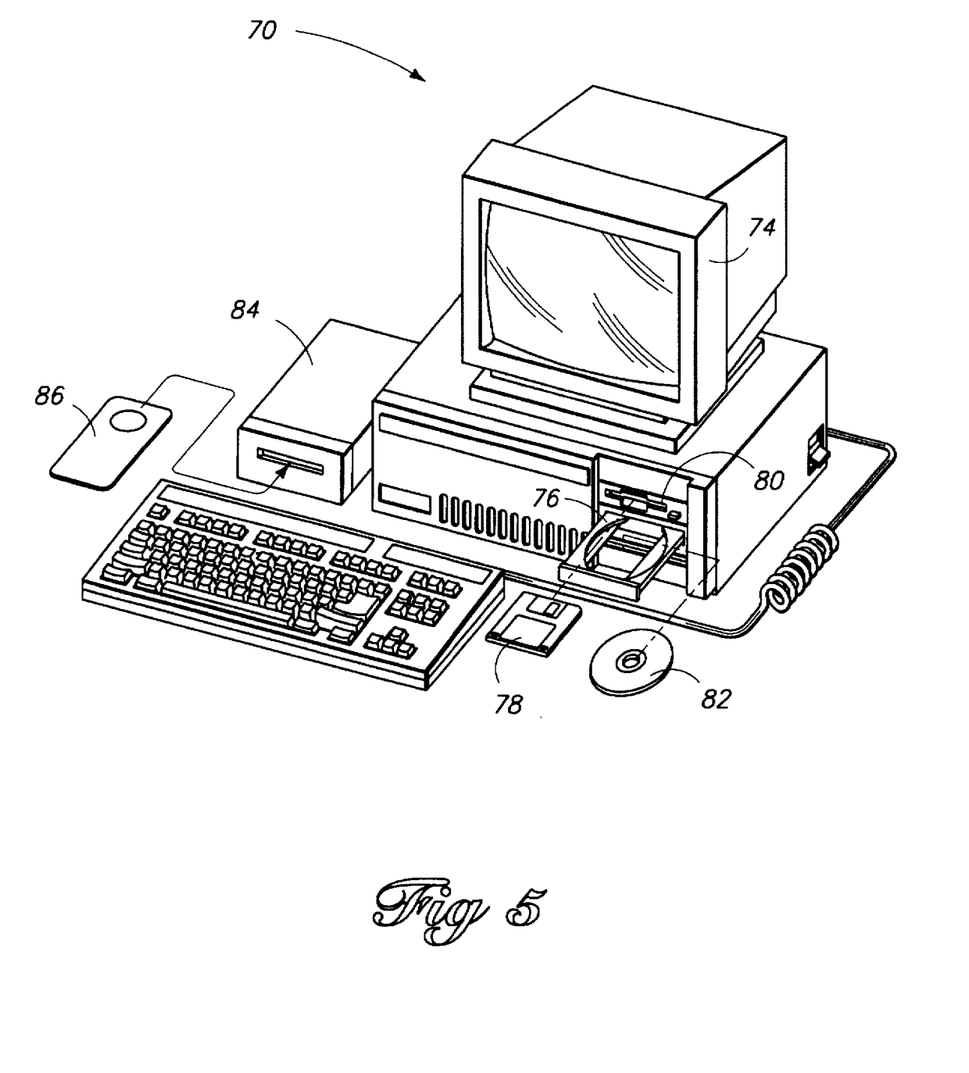
FIG. 5 is a diagrammatic illustration of a computer system that implements the random number generator.

The random number generator can be implemented in a variety of computing environments. An example environment is illustrated in FIG. 5, which shows a computer system 70 that incorporates the pseudo random number generator for cryptography functions. The computer system 70 has a central processing unit 72, a monitor 74, and an input device (not shown) such as a keyboard or mouse. As conventional, the central processing unit 72 has a microprocessor and memory. The computer system 70 also has a floppy disk drive 76 to receive a 3.5" floppy diskette 78 and a CD ROM drive 80 to receive a CD 82.

The computer system 70 is equipped with a card reader 84 to read an IC card 86. In the illustrated embodiment, card 86 is an integrated circuit (IC) card known as a smart card. A "smart card" is a card about the size and thickness of a credit card that has a built-in microcontroller (MCU) which enables the card to modify, or even create, data in response to external stimuli. The microcontroller is a single-wafer integrated circuit which is mounted on an otherwise plastic credit card. The smart card stores and protects the user's electronic commerce information, such as financial data, passwords, account numbers, etc.

Figure 6:
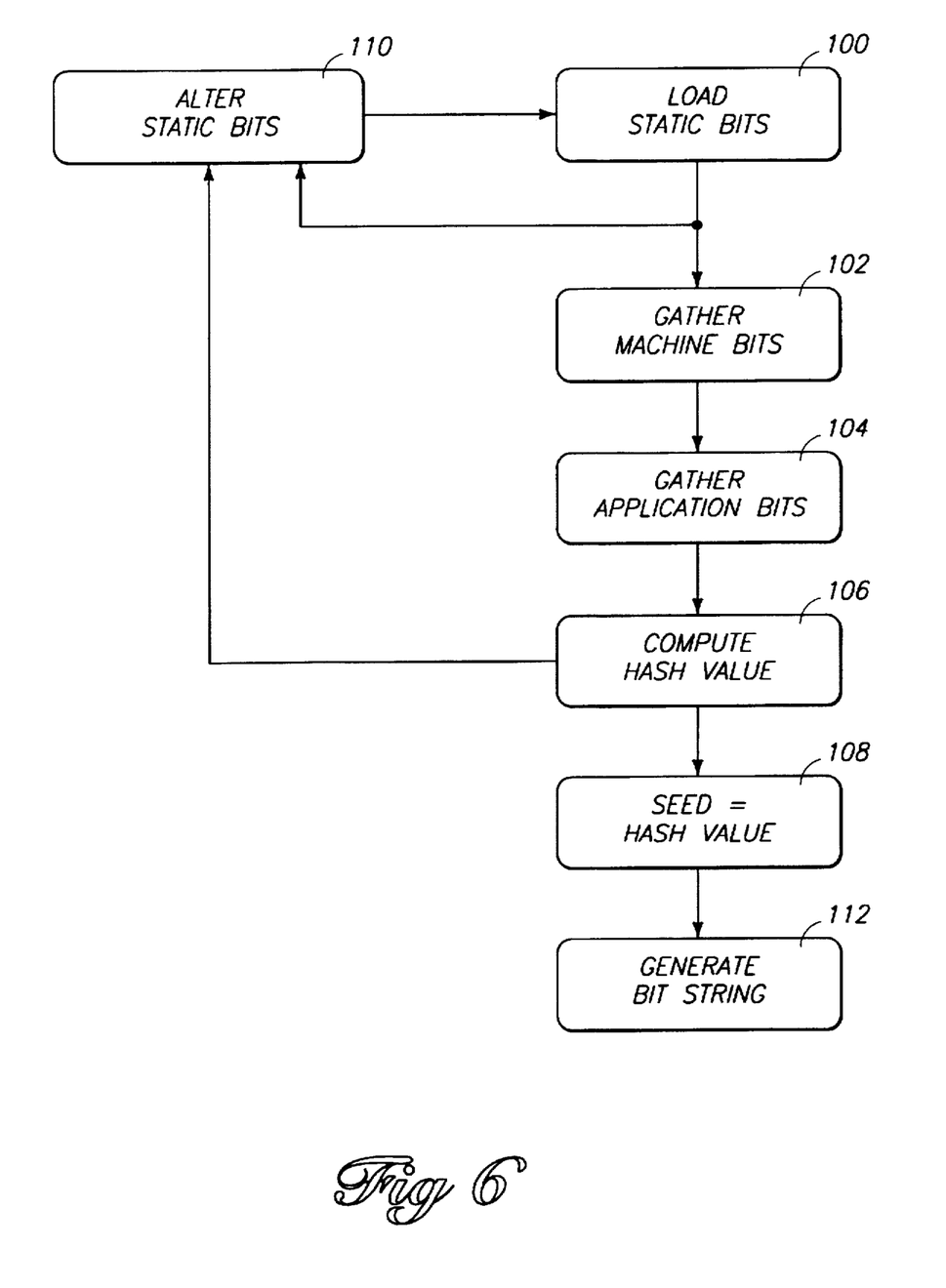
FIG. 6 is a flow diagram of a computer-implemented method for generating random numbers.

To exemplify the wide variety of possible implementations, the random number generator can be configured in the microprocessor of the central processing unit 72; stored as a routine or part of a program on a storage medium such as the CPU memory, floppy diskette 78, or CD 82 which can be loaded and executed on a computer; or programmed into the MCU of the smart card 86. During execution, the computer-implemented random number generator directs the computer to perform the example steps exhibited in the flow diagram of FIG. 6. At step 100, the computer loads the static bits. The computer concurrently gathers the machine class of bits and the application class of bits (steps 102 and 104). At step 106, the computer calculates a hash value of a concatenated version of the three class of bits. This hash value is supplied to the stream generator as a seed (step 108). The hash value is also used to mix or alter the static bit value in the static register (step 110). At step 112, the computer produces a string of pseudo random numbers using the seed.

As an example cryptography context, suppose the computer system 70 in FIG. 5 is an automatic teller machine and the smart card 86 contains the user's financial information. The user inserts the smart card and enters his/her PIN (personal identification number). During a transaction, the smart card might encrypt using random keys critical financial data to be sent to the operating system of the automatic teller machine. During encryption and signing, the card-based random number generator concatenates bits from a static register in the card memory, bits from operating parameters of the MCU on the card, and bits from entry of the user's PIN, and then computes a hash value of the concatenated bits to create a high entropy seed. The seed is then used to produce random keying material.

Additionally, the CPU might encrypt information directed back to the smart card, whereby new keying material is created by the random number generators.

The communication between the automatic teller machine and smart card is provided for example purposes. The same cryptography techniques are used in many other arenas, such as online communication which provides information over a data network between client and server computing units, or interactive television which distributes audio/video information over a network between a head end server and set-top boxes.

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

We claim:

1. A random number generator comprising:
    an input device to assemble multiple classes of bits from multiple sources into an input bit string;
    a hash computing device to compute a hash value of the input bit string using a hashing function; and
    a stream generator coupled to the hash computing device to receive the hash value and to produce an output bit string of random bits using the hash value.

2. A random number generator as recited in claim 1 wherein the multiple classes of bits include an internal class of bits from at least one source internal to the random number generator, and an external class of bits from at least one source external to the random number generator.

3. A random number generator as recited in claim 1 wherein the random number generator is configured to operate on a computer that has multiple operating parameters and executes one or more applications, wherein the multiple classes of bits assembled by the input device include (1) a static class of bits that is maintained within the random number generator, (2) a machine class of bits relating to at least one operating parameter of the computer, and (3) an application class of bits relating to execution of an application running on the computer.

4. A random number generator as recited in claim 1 wherein the stream generator comprises:
    a state register to initially store the hash value received from the hash computing device; and
    transforming logic connected to the state register to transform the hash value into the output bit string of random bits according to a selected transformation, the transforming logic providing feed back bits to the state register to alter the bits held therein from the hash value to another value.

5. A random number generator as recited in claim 1 wherein the hash computing device computes the hash value using a secure hash algorithm.

6. A cryptography system for encrypting and decrypting messages which incorporates the random number generator as recited in claim 1.

7. A processing unit incorporating the random number generator as recited in claim 1.

8. A smart card incorporating the random number generator as recited in claim 1.

9. A random number generator for use on a computer, the computer having multiple operating parameters and executing one or more applications, the random number generator comprising:

a static bit register to hold a static class of bits;

a machine bit register to hold a machine class of bits relating to at least one operating parameter of the computer;

an application bit register to hold an application class of bits relating to execution of an application running on the computer;

a hash computing device coupled to the static bit register, the machine bit register, and the application bit register, the hash computing device computing a hash value of an input bit string that comprises at least one bit from the static bit register, at least one bit from the machine bit register, and at least one bit from the application bit register; and a stream generator coupled to the hash computing device to receive the hash value and to produce an output bit string of random bits using the hash value.

10. A random number generator as recited in claim 9 further comprising:

a bit manipulating device coupled to the static bit register to change a previous bit value that has been used by the hash computing device to a next bit value that is different from the previous bit value.

11. A random number generator as recited in claim 9 further comprising:

a bit manipulating device coupled to the static bit register and to the hash computing device, the bit manipulating device being configured to change a previous bit value that has been used in the hash computing device to a next bit value according to a function of the hash value previously computed by the hash computing device.

12. A random number generator as recited in claim 9 further comprising:

a bit manipulating device coupled to the static bit register and to the hash computing device, the bit manipulating device being configured to change a previous bit value that has been used in the hash computing device to a next bit value according to a hashing function of the previous bit value and the hash value previously computed by the hash computing device.

13. A cryptography system for encrypting and decrypting messages which incorporates the random number generator as recited in claim 9.

14. A processing unit incorporating the random number generator as recited in claim 9.

15. A smart card incorporating the random number generator as recited in claim 9.

16. A random bit seed creating unit for use in a random number generator, the random bit seed creating unit comprising:

a first register to hold a first class of bits;

a second register to hold a second class of bits; and a hash computing device coupled to the first and second registers, the hash computing device computing a hash value of a bit string that comprises at least one bit from the first register and at least one bit from the second register, the hash value being a random bit seed for use in initializing a random number generator.

17. A random bit seed creating unit as recited in claim 16 wherein:

the first register holds an internal class of bits derived from at least one source internal to the random bit seed creating unit; and the second register holds an external class of bits derived from at least one source external to the random bit seed creating unit.

18. A random bit seed creating unit as recited in claim 16 adapted for operation in conjunction with the random number generator on a computer, the computer having multiple operating parameters and executing one or more applications, wherein:

the first register holds a static class of bits that is maintained within the random bit seed creating unit;

the second register holds a machine class of bits relating to at least one operating parameter of the computer; and the random bit seed creating unit further comprising:

a third register to hold an application class of bits relating to execution of an application running on the computer.

19. A random bit seed creating unit as recited in claim 16 further comprising:

a bit manipulating device coupled to the first register to change a previous bit value that has been used by the hash computing device to a next bit value that is different from the previous bit value.

20. A random bit seed creating unit as recited in claim 16 further comprising:

a bit manipulating device coupled to the first bit register and to the hash computing device, the bit manipulating device being configured to change a previous bit value that has been used in the hash computing device to a next bit value according to a function of the hash value previously computed by the hash computing device.

21. A random bit seed creating unit as recited in claim 16 further comprising:

a bit manipulating device coupled to the first bit register and to the hash computing device, the bit manipulating device being configured to change a previous bit value that has been used in the hash computing device to a next bit value according to a hashing function of the previous bit value and the hash value previously computed by the hash computing device.

22. A processing unit incorporating the random bit seed creating unit as recited in claim 16.

23. A smart card incorporating the random bit seed creating unit as recited in claim 16.

24. A computer-readable memory used to direct a computer to generate random numbers, the computer-readable memory directing the computer to perform the following steps:

assemble multiple classes of bits from various sources into an input bit string; and compute a hash value of the input bit string according to a hashing function, the hash value being an initializing seed for use in generating random numbers.

25. A computer-readable memory as recited in claim 24 wherein the computer-readable memory directs the computer during the assemble step to perform the following steps:

hold a static class of bits;

hold a machine class of bits relating to at least one operating parameter of the computer; and hold an application class of bits relating to execution of an application running on the computer.

26. A computer-readable memory as recited in claim 24 further directing the computer to perform an additional step of generating random numbers using the initializing seed.

27. A computer-readable memory as recited in claim 24 further directing the computer to perform the following additional steps:

hold the classes of bits in associated registers; and change a bit value of one of the classes of bits in one of the registers according to a function of the hash value.

28. A computer adapted to generate random numbers, the computer also having multiple operating parameters and executing one or more applications during operation, the computer comprising:

a data processor;

said data processor being programmed to generate random numbers according to the following steps:
  (a) gathering a static class of bits;
  (b) gathering a machine class of bits relating to at least one operating parameter of the computer;
  (c) gathering an application class of bits relating to execution of an application running on the computer;
  (d) computing a hash value of an input bit string that comprises at least one bit from the static class of bits, at least one bit from the machine class of bits, and at least one bit from the application class of bits; and
  (e) producing an output bit string of random bits as a function of the hash value.

29. A computer as recited in claim 28 wherein said data processor is further programmed to perform an additional step of altering a previous bit value in at least one of the classes of bits that has been used to compute the hash value to a next bit value that is different from the previous bit value.

30. A computer as recited in claim 28 wherein said data processor is further programmed to perform an additional step of altering a previous bit value in at least one of the classes of bits that has been used to compute the hash value to a next bit value according to a function of the hash value.

31. A computer as recited in claim 28 wherein said data processor is further programmed to perform an additional step of altering a previous bit value in at least one of the classes of bits that has been used to compute the hash value to a next bit value according to a hashing function of the previous bit value and the hash value.

32. A random number generator comprising:

a hash computing device to compute a hash value of an input bit string using a hashing function; and a stream generator coupled to the hash computing device to receive the hash value and to produce an output bit string of random bits using the hash value.

33. A cryptography system for encrypting and decrypting messages which incorporates the random number generator as recited in claim 32.

34. A processing unit incorporating the random number generator as recited in claim 32.

35. An integrated circuit card incorporating the random number generator as recited in claim 32.

36. A random bit seed creating unit for use in a random number generator, the random bit seed creating unit comprising:

a register to hold a bit string; and a hash computing device coupled to the register, the hash computing device computing a hash value of the bit string, the hash value being a random bit seed for use in initializing a random number generator.

37. A processing unit incorporating the random bit seed creating unit as recited in claim 36.

38. A computer-readable memory used to direct a computer to generate random numbers, the computer-readable memory directing the computer to perform the step of computing a hash value of an input bit string according to a hashing function, the hash value being an initializing seed for use in generating random numbers.

39. A computer adapted to generate random numbers, comprising:

a data processor; and said data processor being programmed to generate random numbers from an initializing seed, the data processor computing the initializing seed by computing a hash value of an input bit string according to a hashing function.

* * * * *